(12) United States Patent
Furuya et al.

(10) Patent No.: US 11,512,231 B2
(45) Date of Patent: Nov. 29, 2022

(54) GAS BARRIER LAMINATE

(71) Applicant: LINTEC CORPORATION, Tokyo (JP)

(72) Inventors: Takumi Furuya, Tokyo (JP); Wataru Iwaya, Tokyo (JP); Takehiro Ohashi, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 16/496,347

(22) PCT Filed: Mar. 23, 2018

(86) PCT No.: PCT/JP2018/011734
§ 371 (c)(1),
(2) Date: Sep. 20, 2019

(87) PCT Pub. No.: WO2018/181004
PCT Pub. Date: Oct. 4, 2018

(65) Prior Publication Data
US 2020/0032115 A1   Jan. 30, 2020

(30) Foreign Application Priority Data

Mar. 28, 2017  (JP) .............................. JP2017-063101

(51) Int. Cl.
*C09J 7/38* (2018.01)
*C09J 7/25* (2018.01)
(Continued)

(52) U.S. Cl.
CPC .............. *C09J 7/385* (2018.01); *C09J 7/255* (2018.01); *C09J 133/08* (2013.01); *C09J 133/14* (2013.01);
(Continued)

(58) Field of Classification Search
CPC . C09J 7/385; C09J 7/255; C09J 133/08; C09J 133/14; C09J 2433/00;
(Continued)

(56) References Cited

U.S. PATENT DOCUMENTS

| 6,436,547 B1 | 8/2002 | Toft et al. | |
| 2005/0100677 A1* | 5/2005 | Su ........................ | B05C 5/0254 |
| | | | 427/420 |

(Continued)

FOREIGN PATENT DOCUMENTS

CN   106457755 A   2/2017
EP   2060391 A1    5/2009
(Continued)

OTHER PUBLICATIONS

International Search Report for PCT/JP2018/011734 (PCT/ISA/210) dated Jun. 19, 2018.
(Continued)

*Primary Examiner* — Scott R. Walshon
(74) *Attorney, Agent, or Firm* — Birch, Stewart, Kolasch & Birch, LLP

(57) ABSTRACT

This gas barrier laminate comprises a base layer; a gas barrier layer laminated on one surface (A) of the base layer, directly or with another layer sandwiched therebetween; a protective film (α) laminated directly on the gas barrier layer; and a protective film (β) laminated on a surface (B) opposite to the surface (A) of the base layer, directly or with another layer sandwiched therebetween, wherein the gas barrier layer contains a specific inorganic compound, and an adhesion at the time of peeling the protective film (α) and an adhesion at the time of peeling the protective film (β) under specific conditions are both less than or equal to specific values. By means of this invention, there is provided a gas barrier laminate having a base layer, a gas barrier layer, and (Continued)

protective films, in which each of the protective films can be peeled off without adversely affecting the external appearance of an exposed surface, and even after the protective film is peeled off, the original water vapor-blocking properties are maintained in the remaining laminate.

6 Claims, 1 Drawing Sheet

(51) Int. Cl.
*C09J 133/08* (2006.01)
*C09J 133/14* (2006.01)

(52) U.S. Cl.
CPC ...... *C09J 2433/00* (2013.01); *C09J 2467/006* (2013.01)

(58) Field of Classification Search
CPC ............ C09J 2467/00; B32B 2307/724; B32B 2307/7246; B32B 2307/50; B32B 27/32; B32B 27/302; B32B 27/36; B32B 2255/10; B32B 2251/10; B32B 2457/00; B32B 9/00
See application file for complete search history.

(56) References Cited

U.S. PATENT DOCUMENTS

| | | | |
|---|---|---|---|
| 2006/0142412 A1* | 6/2006 | Yamaoka | B32B 27/08 523/111 |
| 2008/0102241 A1* | 5/2008 | Yutou | C09J 7/38 428/343 |
| 2011/0206900 A1 | 8/2011 | Iwase | |
| 2011/0274933 A1* | 11/2011 | Hoshi | B32B 27/08 428/446 |
| 2012/0064321 A1 | 3/2012 | Suzuki et al. | |
| 2013/0224435 A1 | 8/2013 | Iwase | |
| 2014/0178622 A1 | 6/2014 | Fuchi et al. | |
| 2015/0147510 A1* | 5/2015 | Saito | C09J 7/405 428/40.9 |
| 2017/0107344 A1* | 4/2017 | Iwaya | B32B 27/283 |
| 2018/0022881 A1 | 1/2018 | Seki et al. | |

FOREIGN PATENT DOCUMENTS

| | | | |
|---|---|---|---|
| JP | 62-195024 | A | 8/1987 |
| JP | 63-81122 | A | 4/1988 |
| JP | 1-138108 | A | 5/1989 |
| JP | 2-84437 | A | 3/1990 |
| JP | 2-175726 | A | 7/1990 |
| JP | 4-63833 | A | 2/1992 |
| JP | 5-238827 | A | 9/1993 |
| JP | 5-345826 | A | 12/1993 |
| JP | 6-122852 | A | 5/1994 |
| JP | 6-299118 | A | 10/1994 |
| JP | 6-306329 | A | 11/1994 |
| JP | 9-31333 | A | 2/1997 |
| JP | 2008-70685 | A | 3/2008 |
| JP | 2011-207125 | A | 10/2011 |
| JP | 2012-106421 | A | 6/2012 |
| JP | 2013-39817 | A | 2/2013 |
| JP | 2013-226757 | A | 11/2013 |
| JP | 2015-189047 | A | 11/2015 |
| JP | 2016-122173 | A | 7/2016 |
| JP | 2017-43058 | A | 3/2017 |
| WO | WO 2008/099445 | A1 | 8/2008 |
| WO | WO 2010/107018 | A1 | 9/2010 |
| WO | WO 2013/018602 | A1 | 2/2013 |
| WO | WO 2015/146323 | A1 | 10/2015 |
| WO | WO-2015152077 | A1 * | 10/2015 ............ C08J 7/0427 |
| WO | WO 2016/152558 | A | 9/2016 |

OTHER PUBLICATIONS

Chinese Office Action for corresponding Chinese Application No. 201880019121.7, dated Jan. 6, 2021, with Japanese translation of the Chinese Office Action and Search Report and English translation.

Extended European Search Report, dated Dec. 1, 2020, for European Application No. 18774711.8.

* cited by examiner

[Fig.1]
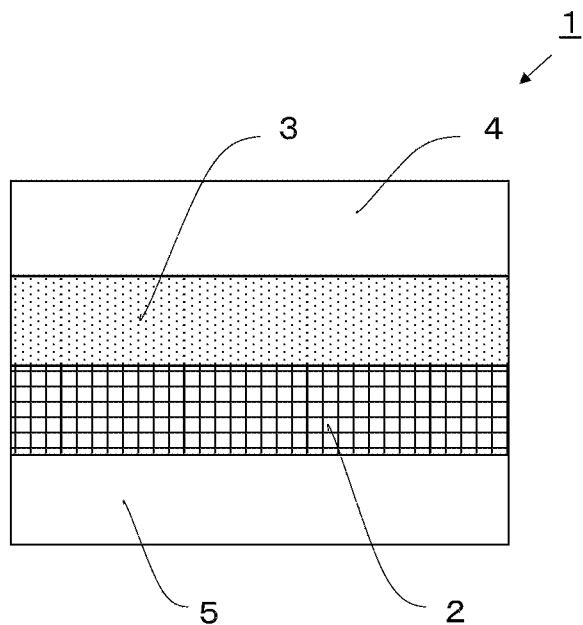
[Fig.2]
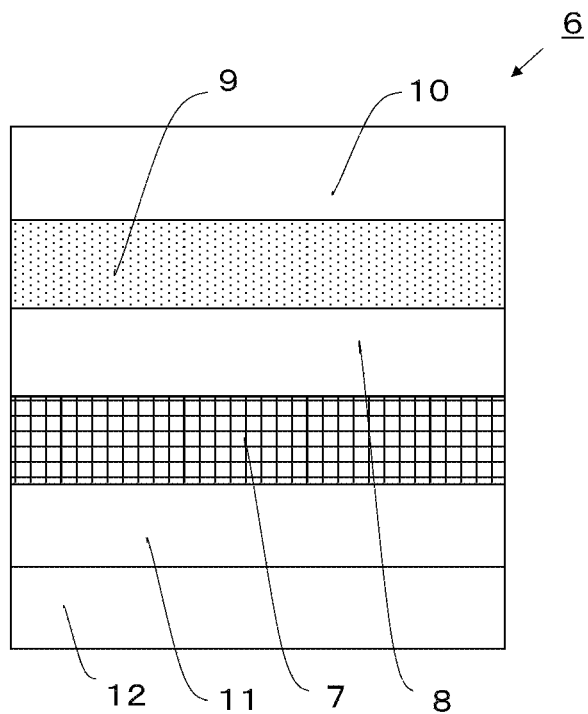

GAS BARRIER LAMINATE

TECHNICAL FIELD

The present invention relates to a gas barrier laminate having a base layer, a gas barrier layer, and protective films, in which each of the protective films can be peeled off without adversely affecting the external appearance of an exposed surface, and even after the protective film is peeled off, the original water vapor-blocking properties are maintained in the remaining laminate.

BACKGROUND ART

In recent years, gas barrier laminates having a base layer and a gas barrier layer formed of an inorganic film or the like have been widely used as substrate materials or sealing materials.

For an industrial purpose, a gas barrier laminate is often produced as a long material and then wound into a roll, which is stored and transported as a wound material. In such a gas barrier laminate, a protective film may be provided as an outermost layer on one or both sides of the laminate in order to protect the gas barrier layer and the like.

Patent Literature 1, for example, discloses a functional film (laminate) having a support; a functional layer including at least one organic film and at least one inorganic film that are alternately arranged on one side of the support; a first laminated film arranged on the other side of the support; and a second laminated film arranged on a top layer of the functional layer, wherein an adhesion between the second laminated film and the top layer is less than an adhesion between the first laminated film and the support.

CITATION LIST

Patent Literature

Patent Literature 1: Japanese Patent Laid-Open No. 2011-207125 (US 2011/0206900 A1 and US 2013/0224435 A1)

SUMMARY OF INVENTION

Technical Problem

When the laminate as described in Patent Literature 1 is used, the protective films (laminated films) are peeled off and the remaining laminate is subjected to predetermined processing or the like.

However, when the protective films are peeled off at high speed to increase productivity, exposed surfaces of the remaining laminate may be damaged. When such an exposed surface is a functional layer such as a gas barrier layer, the occurrence of damage may significantly reduce the function.

With regard to this point, as in the laminate produced in the Examples of Patent Literature 1, in a laminate having an organic film on an inorganic film, and further having a protective film thereon, the organic film functions as a protective layer for the inorganic film, and thus, the inorganic film can be prevented from damage when the protective film is peeled off.

However, in the gas barrier laminate that utilizes this method, it is always necessary to have the organic film on the gas barrier layer, which makes the production process for the gas barrier laminate complicated.

Accordingly, there has been a desire for a gas barrier laminate including a gas barrier layer and a protective film that are in direct contact with each other, in which the protective film can be peeled off without adversely affecting the external appearance of an exposed surface, and even after the protective film is peeled off, the original water vapor-blocking properties are maintained in the remaining laminate.

Solution to Problem

The inventors of the present invention conducted extensive studies with regard to a gas barrier laminate having a base layer, a gas barrier layer, and protective films, in order to solve the above-described problem. As a result, the inventors found that in a gas barrier laminate comprising a base layer; a gas barrier layer laminated on one surface (A) of the base layer, directly or with another layer sandwiched therebetween; a protective film ($\alpha$) laminated directly on the gas barrier layer; and a protective film ($\beta$) laminated on a surface (B) opposite to the surface (A) of the base layer, directly or with another layer sandwiched therebetween, wherein an adhesion at the time of peeling each of the protective film ($\alpha$) and the protective film ($\beta$) under specific conditions is a specific value or lower, each of the protective films can be peeled off without adversely affecting the external appearance of an exposed surface, and even after the protective film is peeled off, the original water vapor-blocking properties are maintained in the remaining laminate. This finding has led to the completion of the present invention.

Accordingly, in accordance with the present invention, there is provided a gas barrier laminate as set forth in [1] to [6] below:

[1] A gas barrier laminate comprising:
  a base layer;
  a gas barrier layer laminated on one surface (A) of the base layer, directly or with another layer sandwiched therebetween;
  a protective film ($\alpha$) laminated directly on the gas barrier layer; and
  a protective film ($\beta$) laminated on a surface (B) opposite to the surface (A) of the base layer, directly or with another layer sandwiched therebetween, wherein
  an adhesion at the time of peeling the protective film ($\alpha$) at a peel rate of 10 m/minute and a peel angle of 180° is 0.1 N/50 mm or less, and
  an adhesion at the time of peeling the protective film ($\beta$) at a peel rate of 10 m/minute and a peel angle of 180° is 1.5 N/50 mm or less.

[2] The gas barrier laminate according to [1], wherein the gas barrier layer contains at least one selected from the group consisting of silicon oxide, silicon nitride, silicon fluoride, silicon carbide, a metal oxide, a metal nitride, a metal fluoride, a metal carbide, and a composite compound containing elements constituting these compounds.

[3] The gas barrier laminate according to [1] or [2], wherein the protective film ($\alpha$) is a laminated film having a support ($\alpha 1$) and an adhesive layer ($\alpha 2$).

[4] The gas barrier laminate according to any of [1] to [3], wherein the protective film ($\beta$) is a laminated film having a support ($\beta 1$) and an adhesive layer ($\beta 2$).

[5] The gas barrier laminate according to any of [1] to [4], wherein when the protective film ($\alpha$) is peeled at a peel rate of 10 m/minute and a peel angle of 180°, and then the protective film ($\beta$) is peeled at a peel rate of 10 m/minute and a peel angle of 180°, the remaining laminate has a water vapor permeability of less than 0.2 g·m$^{-2}$·day$^{-1}$.

[6] The gas barrier laminate according to any of [1] to [5], wherein the gas barrier layer is obtained by modifying a surface of a layer that can be changed into a layer containing an inorganic compound by undergoing a modification treatment.

[7] The gas barrier laminate according to any of [1] to [6], which is used for a sensor device or an optical device.

Advantageous Effects of Invention

In accordance with the present invention, there is provided a gas barrier laminate having a base layer, a gas barrier layer, and protective films, in which each of the protective films can be peeled off without adversely affecting the external appearance of an exposed surface, and even after the protective film is peeled off, the original water vapor-blocking properties are maintained in the remaining laminate.

BRIEF DESCRIPTION OF DRAWINGS

FIG. 1 is a schematic diagram showing one example of the layer structure of the gas barrier laminate of the present invention.

FIG. 2 is a schematic diagram showing one example of the layer structure of the gas barrier laminate of the present invention.

DESCRIPTION OF EMBODIMENTS

The gas barrier laminate of the present invention is a gas barrier laminate comprising a base layer; a gas barrier layer laminated on one surface (A) of the base layer, directly or with another layer sandwiched therebetween; a protective film (α) laminated directly on the gas barrier layer; and a protective film (β) laminated on a surface (B) opposite to the surface (A) of the base layer, directly or with another layer sandwiched therebetween, wherein an adhesion at the time of peeling the protective film (α) at a peel rate of 10 m/minute and a peel angle of 180° is 0.1 N/50 mm or less, and an adhesion at the time of peeling the protective film (β) at a peel rate of 10 m/minute and a peel angle of 180° is 1.5 N/50 mm or less.

[Base Layer]

The base layer constituting the gas barrier laminate of the present invention is not particularly limited as long as it has excellent transparency, and the gas barrier layer and the like can be supported thereon.

A resin film is usually used as the base layer.

Examples of the resin component of the resin film include polyimide, polyamide, polyamide-imide, polyphenylene ether, polyether ketone, polyetheretherketone, polyolefins, polyesters, polycarbonates, polysulfone, polyethersulfone, polyphenylene sulfide, acrylic resins, cycloolefin-based polymers, and aromatic polymers.

Among these, polyesters, polycarbonates, cycloolefin-based polymers, or aromatic polymers are preferable in that they have superior transparency and have versatility. Polyesters are more preferable from the viewpoint of versatility, and cycloolefin-based polymers are more preferable from the viewpoint of transparency.

Examples of polyesters include polyethylene terephthalate, polybutylene terephthalate, polyethylene naphthalate, and polyarylate; and polyethylene terephthalate is preferable.

Examples of polycarbonates include polymers obtained by reacting bisphenols, such as 2,2-bis(4-hydroxyphenyl)propane (synonym: bisphenol A), 2,2-bis(4-hydroxyphenyl)butane, 1,1-bis(4-hydroxyphenyl)cyclohexane, 1,1-bis(4-hydroxyphenyl)isobutane, and 1,1-bis(4-hydroxyphenyl)ethane, with phosgene or diphenyl carbonate.

Examples of cycloolefin-based polymers include norbornene-based polymers, monocyclic olefin-based polymers, cyclic conjugated diene-based polymers, vinyl alicyclic hydrocarbon polymers, and hydrides thereof. Specific examples thereof include APEL (ethylene-cycloolefin copolymer manufactured by Mitsui Chemicals, Inc.), ARTON (norbornene-based polymer manufactured by JSR Corporation), and ZEONOR (norbornene-based polymer manufactured by Zeon Corporation).

Examples of aromatic polymers include polystyrene.

The resin film may contain various additives as long as the effects of the present invention are not impaired. Examples of the additives include an ultraviolet absorber, an antistatic agent, a stabilizer, an antioxidant, a plasticizer, a lubricant, and a color pigment. The amount of these additives to be contained may be appropriately determined according to the purpose.

The resin film can be obtained by preparing a resin composition containing the resin component and optionally the various additives, and molding the composition into a film. The molding method is not particularly limited, and a known method such as the casting method or the melt extrusion method can be used.

The thickness of the base layer is not particularly limited, and may be determined according to the purpose of the gas barrier laminate. The thickness of the base layer is usually 0.5 to 500 μm, and preferably 1 to 100 μm.

[Gas Barrier Layer]

The gas barrier layer constituting the gas barrier laminate of the present invention is a layer having the property of preventing the permeation of gases, such as oxygen and water vapor (gas barrier property). This gas barrier layer is laminated on one surface (A) of the base layer, directly or with another layer sandwiched therebetween.

The thickness of the gas barrier layer is usually 1 to 2000 nm, more preferably 3 to 1000 nm, and still more preferably 5 to 500 nm.

The gas barrier layer preferably contains silicon oxide, silicon nitride, silicon fluoride, silicon carbide, a metal oxide, a metal nitride, a metal fluoride, a metal carbide, and a composite compound containing elements constituting these compounds.

Examples of such a gas barrier layer include a vapor-deposited inorganic film; and a layer obtained by modifying a surface of a layer that can be changed into a layer containing an inorganic compound by undergoing a modification treatment [in this case, the gas barrier layer means "the layer including the modified region", rather than the modified region only].

Examples of the vapor-deposited inorganic film include vapor-deposited films of inorganic compounds or metals.

Examples of raw materials of vapor-deposited films of inorganic compounds include inorganic oxides, such as silicon oxide, aluminum oxide, magnesium oxide, zinc oxide, indium oxide, and tin oxide; inorganic nitrides, such as silicon nitride, aluminum nitride, and titanium nitride; inorganic carbides; inorganic sulfides; inorganic oxynitrides, such as silicon oxynitride; inorganic oxycarbides; inorganic nitrocarbides; and inorganic oxynitrocarbides.

Examples of raw materials of vapor-deposited films of metals include aluminum, magnesium, zinc, and tin.

These raw materials can be used singly or in combinations of two or more.

Among these, a vapor-deposited inorganic film obtained using an inorganic oxide, an inorganic nitride, or a metal as a raw material is preferable, from the viewpoint of the gas barrier property; and a vapor-deposited inorganic film obtained using an inorganic oxide or an inorganic nitride as a raw material is preferable, from the viewpoint of transparency.

Examples of the method of forming the vapor-deposited inorganic film include PVD (physical vapor deposition) methods, such as a vacuum deposition method, a sputtering method, and an ion plating method; and CVD methods, such as a thermal CVD (chemical vacuum deposition) method, a plasma CVD method, and a photo-CVD method.

While the thickness of the vapor-deposited inorganic film varies depending on the inorganic compound or metal to be used, it is preferably in the range of 1 to 2000 nm, more preferably 3 to 1000 nm, and still more preferably 5 to 500 nm, from the viewpoint of the gas barrier property and handleability.

Examples of the layer that can be changed into a layer containing an inorganic compound by undergoing a modification treatment include a layer containing a silicon-containing polymer compound (hereinafter sometimes referred to as the "polymer layer"). The "layer that can be changed into a layer containing an inorganic compound by undergoing a modification treatment" also includes a layer containing an inorganic polymer compound, such as the inorganic polysilazane described below. In this case, by undergoing a modification treatment, the layer containing an inorganic polymer compound is at least partially changed into a layer containing an inorganic compound having a different composition.

The polymer layer may contain other components in addition to the silicon-containing polymer compound, as long as the purpose of the present invention is not impaired. Examples of the other components include a curing agent, an antioxidant, a light stabilizer, and a flame retardant.

The amount of the silicon-containing polymer compound to be contained in the polymer layer is preferably 50% by mass or more, and more preferably 70% by mass or more, in that this allows the formation of a gas barrier layer having superior gas barrier property.

While the thickness of the polymer layer is not particularly limited, it is usually in the range of 1 to 2000 nm, preferably 3 to 1000 nm, and more preferably 5 to 500 nm.

The polymer layer can be formed by, for example, applying a solution prepared by dissolving or dispersing the silicon-containing polymer compound in an organic solvent onto the base layer directly or with another layer sandwiched therebetween, by a known coating method, and drying the resulting coating film.

Examples of the organic solvent include aromatic hydrocarbon-based solvents, such as benzene and toluene; ester-based solvents, such as ethyl acetate and butyl acetate; ketone-based solvents, such as acetone, methyl ethyl ketone, and methyl isobutyl ketone; aliphatic hydrocarbon-based solvents, such as n-pentane, n-hexane, and n-heptane; and alicyclic hydrocarbon-based solvents, such as cyclopentane and cyclohexane.

These solvents can be used singly or in combinations of two or more.

Examples of the coating method include a bar coating method, a spin coating method, a dipping method, a roll coating method, a gravure coating method, a knife coating method, an air knife coating method, a roll knife coating method, a die coating method, a screen printing method, a spray coating method, and a gravure offset method.

Examples of the method of drying the coating film include conventionally known drying methods, such as hot-air drying, hot roll drying, and infrared irradiation. The heating temperature is usually 80 to 150° C., and the heating time is usually from several tens of seconds to several tens of minutes.

Examples of the method of modifying the surface of the polymer layer include an ion implantation treatment, a plasma treatment, an ultraviolet irradiation treatment, and a heat treatment.

The ion implantation treatment is a method in which accelerated ions are implanted into the polymer layer to modify the polymer layer, as described below.

The plasma treatment is a method in which the polymer layer is exposed to plasma to modify the polymer layer. For example, the plasma treatment can be performed in accordance with the method described in Japanese Patent Laid-Open No. 2012-106421.

The ultraviolet irradiation treatment is a method in which the polymer layer is irradiated with ultraviolet light to modify the polymer layer. For example, the ultraviolet modification treatment can be performed in accordance with the method described in Japanese Patent Laid-Open No. 2013-226757.

Examples of the silicon-containing polymer compound include polysilazane-based compounds, polycarbosilane-based compounds, polysilane-based compounds, polyorganosiloxane-based compounds, poly(disilanylenephenylene)-based compounds, and poly(disilanyleneethynylene)-based compounds; and polysilazane-based compounds are preferable.

A polysilazane-based compound is a compound having a repeating unit containing a —Si—N-bond (silazane bond) in the molecule. Specifically, the polysilazane-based compound is preferably a compound having the repeating unit represented by the formula (1):

[Formula 1]

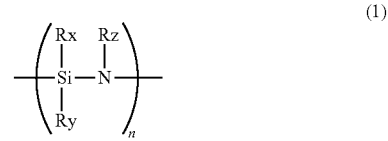

While the number average molecular weight of the polysilazane-based compound to be used is not particularly limited, it is preferably 100 to 50,000.

In the formula (1) above, n represents any natural number. Rx, Ry, and Rz each independently represent a hydrogen atom, a substituted or unsubstituted alkyl group, a substituted or unsubstituted cycloalkyl group, a substituted or unsubstituted alkenyl group, a substituted or unsubstituted aryl group, or a non-hydrolyzable group, such as an alkylsilyl group.

Examples of the alkyl group of the substituted or unsubstituted alkyl group include $C_{1-10}$ alkyl groups, such as a methyl group, an ethyl group, an n-propyl group, an isopropyl group, an n-butyl group, an isobutyl group, a sec-butyl group, a t-butyl group, an n-pentyl group, an isopentyl group, a neopentyl group, an n-hexyl group, an n-heptyl group, and an n-octyl group.

Examples of the cycloalkyl group of the substituted or unsubstituted cycloalkyl group include $C_{3-10}$ cycloalkyl groups, such as a cyclobutyl group, a cyclopentyl group, a cyclohexyl group, and a cycloheptyl group.

Examples of the alkenyl group of the substituted or unsubstituted alkenyl group include $C_{2-10}$ alkenyl groups, such as a vinyl group, a 1-propenyl group, a 2-propenyl group, a 1-butenyl group, a 2-butenyl group, and a 3-butenyl group.

Examples of substituents for the alkyl group, cycloalkyl group, and alkenyl group include halogen atoms, such as a fluorine atom, a chlorine atom, a bromine atom, and an iodine atom; a hydroxyl group; a thiol group; an epoxy group; a glycidoxy group; a (meth)acryloyloxy group; and substituted or unsubstituted aryl groups, such as a phenyl group, a 4-methylphenyl group, and a 4-chlorophenyl group.

Examples of the aryl group of the substituted or unsubstituted aryl group include $C_{6-15}$ aryl groups, such as a phenyl group, a 1-naphthyl group, and a 2-naphthyl group.

Examples of substituents for the aryl group include halogen atoms, such as a fluorine atom, a chlorine atom, a bromine atom, and an iodine atom; $C_{1-6}$ alkyl groups, such as a methyl group and an ethyl group; $C_{1-6}$ alkoxy groups, such as a methoxy group and an ethoxy group; a nitro group; a cyano group; a hydroxyl group; a thiol group; an epoxy group; a glycidoxy group; a (meth)acryloyloxy group; and substituted or unsubstituted aryl groups, such as a phenyl group, a 4-methylphenyl group, and a 4-chlorophenyl group.

Examples of the alkylsilyl group include a trimethylsilyl group, a triethylsilyl group, a triisopropylsilyl group, a tri-t-butylsilyl group, a methyldiethylsilyl group, a dimethylsilyl group, a diethylsilyl group, a methylsilyl group, and an ethylsilyl group.

Among these, Rx, Ry, and Rz are each preferably a hydrogen atom, a $C_{1-6}$ alkyl group, or a phenyl group, and particularly preferably a hydrogen atom.

The polysilazane-based compound having the repeating unit represented by the formula (1) above may be either an inorganic polysilazane in which all of Rx, Ry, and Rz are hydrogen atoms, or an organopolysilazane in which at least one of Rx, Ry, and Rz is not a hydrogen atom.

In the present invention, a modified polysilazane may also be used as the polysilazane-based compound. Examples of the modified polysilazane include those described in, for example, Japanese Patent Laid-Open No. 62-195024, Japanese Patent Laid-Open No. 2-84437, Japanese Patent Laid-Open No. 63-81122, Japanese Patent Laid-Open No. 1-138108, Japanese Patent Laid-Open No. 2-175726, Japanese Patent Laid-Open No. 5-238827, Japanese Patent Laid-Open No. 5-238827, Japanese Patent Laid-Open No. 6-122852, Japanese Patent Laid-Open No. 6-306329, Japanese Patent Laid-Open No. 6-299118, Japanese Patent Laid-Open No. 9-31333, Japanese Patent Laid-Open No. 5-345826, and Japanese Patent Laid-Open No. 4-63833.

Among these, the polysilazane-based compound is preferably a perhydropolysilazane in which all of Rx, Ry, and Rz are a hydrogen atom, from the viewpoint of being readily available, and allowing the formation of an ion implantation layer having excellent gas barrier property.

As the polysilazane-based compound, a product commercially available as a glass coating material or the like can also be used as is.

These polysilazane-based compounds can be used singly or in combinations of two or more.

Examples of the ion to be implanted into the polymer layer include ions of rare gases, such as argon, helium, neon, krypton, and xenon; ions of fluorocarbon, hydrogen, nitrogen, oxygen, carbon dioxide, chlorine, fluorine, sulfur, and the like; ions of alkane-based gases, such as methane and ethane; ions of alkene-based gases, such as ethylene and propylene; ions of alkadiene-based gases, such as pentadiene and butadiene; ions of alkyne-based gases, such as acetylene; ions of aromatic hydrocarbon-based gases, such as benzene and toluene; ions of cycloalkane-based gases, such as cyclopropane; ions of cycloalkene-based gases, such as cyclopentene; ions of metals; and ions of organosilicon compounds.

These ions can be used singly or in combinations of two or more.

Among these, ions of rare gases, such as argon, helium, neon, krypton, and xenon, are preferable in that these ions can be more easily implanted and can form a gas barrier layer having superior gas barrier property.

The dose of ions can be appropriately determined according to the purpose of use and the like of the gas barrier laminate (the required gas barrier property, transparency, and the like).

Examples of the method of implanting ions include a method in which ions accelerated by an electric field (ion beam) are applied; and a method in which ions in plasma are implanted. Among these, the method in which ions in plasma are implanted (plasma ion implantation method) is preferable in that the intended gas barrier layer can be easily formed.

The plasma ion implantation method can be performed by, for example, generating plasma in an atmosphere containing a plasma-producing gas, such as a rare gas, and implanting the ions (cations) in the plasma into a surface portion of the polymer layer by applying a negative high-voltage pulse to the polymer layer. More specifically, the plasma ion implantation method can be performed by the method described in WO 2010/107018, for example.

The thickness of the region to be implanted with ions by ion implantation can be controlled depending on the implantation conditions, such as the type of the ions, applied voltage, and treatment time, and may be determined according to the thickness of the polymer layer, the purpose of use of the laminate, and the like; usually, the thickness is 10 to 400 nm.

The fact that the ions have been implanted can be confirmed by performing measurement of elemental analysis at around 10 nm from the surface of the polymer layer, using X-ray photoelectron spectroscopy (XPS).

[Protective Film (α)]

The protective film (α) constituting the gas barrier laminate of the present invention is laminated directly on the gas barrier layer. The protective film (α) functions to protect the gas barrier layer during the transport or storage of the gas barrier laminate.

Examples of the protective film (α) include a laminated film having a support (α1) and an adhesive layer (α2).

While the support (α1) is not particularly limited as long as the adhesive layer (α2) can be supported thereon, it is preferably a resin film. Examples of the resin film include the same resin films as those previously mentioned as the resin film constituting the base layer. Among these, the support (α1) is preferably a polyolefin-based film.

The polyolefin-based film has an appropriate elastic modulus, and therefore, when the polyolefin-based film is used as the support (α1), the protective film (α) can be smoothly peeled off.

Examples of the polyolefin constituting the polyolefin-based film include polyethylene, polypropylene, and an ethylene-α-olefin copolymer. Among these, polyethylene is preferable.

While the thickness of the support (α1) is not particularly limited, it is usually 1 to 500 µm, and preferably 5 to 100 µm.

Examples of the polymer component contained in the adhesive layer (α2) include an acrylic polymer, a natural rubber-based polymer, a synthetic rubber-based polymer, an ethylene-vinyl acetate copolymer, a polyolefin-based polymer, an ethylene-(meth)acrylate copolymer, a styrene-isoprene block copolymer, and a styrene-butadiene block copolymer.

Among these, the polymer component contained in the adhesive layer (α2) is preferably an acrylic polymer or a polyolefin-based polymer.

By forming the adhesive layer (α2) containing any of these polymers, the protective film (α) can be readily obtained in which the adhesion at the time of peeling the protective film (α) at a peel rate of 10 m/minute and a peel angle of 180° is 0.1 N/50 mm or less.

The adhesive layer (α2) preferably has a storage modulus at 25° C. of $1\times10^4$ to $1\times10^6$ Pa. When the storage modulus at 25° C. of the adhesive layer (α2) is within this range, the protective film (α) can be smoothly peeled, without leaving a paste residue on the base.

As described below, the acrylic polymer is also suitably used as the polymer component contained in the adhesive layer (β2). However, because the adhesion required in the adhesive layer (α2) is not equal to the adhesion required in the adhesive layer (β2), it is preferable to consider the type of the acrylic polymer to be used, the crosslinking density thereof, the addition of non-adhesive components, and the like, in order to achieve the intended adhesion.

In an adhesive layer containing an acrylic polymer, when the crosslinking density is appropriate, the adhesion tends to be high, and when the crosslinking density is low or excessively high, the adhesion tends to be low. An adhesive layer having a low adhesion, such as the adhesive layer (α2), can be efficiently formed based on this finding.

Moreover, in general, in an adhesive layer formed using the same adhesive composition, the adhesion tends to be lower as the adhesive layer becomes thinner. Thus, the thickness of the adhesive layer may be adjusted to achieve the intended adhesion.

The adhesive layer (α2) may contain additives. Examples of the additives include an antistatic agent, a slip agent, and a tackifier.

While the thickness of the adhesive layer (α2) is not particularly limited, it is usually 0.1 to 50 µm, and preferably 0.5 to 20 µm.

The laminated film having the support (α1) and the adhesive layer (α2) can be efficiently produced by co-extruding the raw material resin for the support (α1) and the raw material resin for the adhesive layer (α2).

[Protective Film (β)]

The protective film (β) constituting the gas barrier laminate of the present invention is laminated on the surface (B) of the base layer, directly or with another layer sandwiched therebetween.

Examples of the protective film (β) include a laminated film having a support (β1) and an adhesive layer (β2).

While the support (β1) is not particularly limited as long as the adhesive layer (β2) can be supported thereon, it is preferably a resin film. Examples of the resin film include the same resin films as those previously mentioned as the resin film constituting the base layer. Among these, the support (β1) is preferably a polyester-based film.

When the support (β1) is a polyester-based film, it can appropriately support the adhesive layer (β2) and has excellent handleability.

While the thickness of the support (β1) is not particularly limited, it is usually 1 to 500 µm, and preferably 10 to 200 µm.

Examples of the polymer component contained in the adhesive layer (β2) include an acrylic polymer, a natural rubber-based polymer, a synthetic rubber-based polymer, an ethylene-vinyl acetate copolymer, a polyolefin-based polymer, an ethylene-(meth)acrylate copolymer, a styrene-isoprene block copolymer, and a styrene-butadiene block copolymer.

Among these, the polymer component contained in the adhesive layer (β2) is preferably an acrylic polymer.

As described above, in the adhesive containing the acrylic polymer, the intended adhesion can be achieved by adjusting the type of the acrylic polymer, the crosslinking density thereof, and the like.

Thus, by appropriately selecting the acrylic polymer to be used and the like, based on the above-described finding, the protective film (β) can be readily obtained in which the adhesion at the time of peeling the protective film (β) at a peel rate of 10 m/minute and a peel angle of 180° is 1.5 N/50 mm or less.

Examples of the acrylic polymer include an acrylic copolymer having a repeating unit derived from a (meth)acrylic acid ester having a $C_{1-20}$ hydrocarbon group and a repeating unit derived from a functional group-containing monomer.

Examples of the (meth)acrylic acid ester having a $C_{1-20}$ hydrocarbon group include methyl (meth)acrylate, ethyl (meth)acrylate, propyl (meth)acrylate, n-butyl (meth)acrylate, 2-ethylhexyl (meth)acrylate, lauryl (meth)acrylate, tridecyl (meth)acrylate, and stearyl (meth)acrylate.

Examples of the functional group-containing monomer include a hydroxy group-containing monomer, a carboxy group-containing monomer, an epoxy group-containing monomer, an amino group-containing monomer, a cyano group-containing monomer, a keto group-containing monomer, and an alkoxysilyl group-containing monomer. Among these, the functional group-containing monomer is preferably the hydroxy group-containing monomer or carboxy group-containing monomer.

Examples of the hydroxy group-containing monomer include 2-hydroxyethyl (meth)acrylate, 2-hydroxypropyl (meth)acrylate, 2-hydroxybutyl (meth)acrylate, 3-hydroxybutyl (meth)acrylate, and 4-hydroxybutyl (meth)acrylate.

Examples of the carboxy group-containing monomer include (meth)acrylic acid, maleic acid, fumaric acid, and itaconic acid.

Among these, 2-ethylhexyl (meth)acrylate is preferably used as the monomer, because an adhesive layer having an intended adhesion can be readily formed.

In the adhesive layer (β2), a crosslinked structure may be formed. The crosslinked structure can be formed by a known method using a crosslinking agent.

Examples of the crosslinking agent to be used include an isocyanate-based crosslinking agent, which is a compound having an isocyanate group as a crosslinkable group; an epoxy-based crosslinking agent, which is a compound having an epoxy group as a crosslinkable group; an aziridine-based crosslinking agent, which is a compound having an aziridine group as a crosslinkable group; and a metal chelate-based crosslinking agent, which is a chelate compound or the like in which the metal atom is aluminum, zirconium, titanium, zinc, iron, tin, or the like.

These crosslinking agents can be used singly or in combinations of two or more.

From the viewpoint of readily obtaining a protective film having an intended adhesion, the amount of the crosslinking agent to be blended is preferably 0.1 to 10 parts by mass, more preferably 0.5 to 8 parts by mass, and particularly preferably 1 to 5 parts by mass, per 100 parts by mass of the polymer component contained in the adhesive layer (β2).

The adhesive layer (β2) may contain additives. Examples of the additives include an antistatic agent, a slip agent, and a tackifier. Specific examples thereof include the same ones as those listed as the antistatic agent, slip agent, and tackifier that may be added to the adhesive layer (α2).

While the thickness of the adhesive layer (β2) is not particularly limited, it is usually 0.5 to 30 μm, and preferably 1 to 15 μm. When the thickness of the adhesive layer (β2) is within this range, the protective film (β) can be readily obtained in which the adhesion at the time of peeling the protective film (β) at a peel rate of 10 m/minute and a peel angle of 180° is 1.5 N/50 mm or less.

The adhesive layer (β2) preferably has a storage modulus at 25° C. of $1 \times 10^4$ to $1 \times 10^6$ Pa. When the storage modulus at 25° C. of the adhesive layer (β2) is within this range, the protective film (β) can be smoothly peeled, without leaving a paste residue on the base.

The laminated film having the support (β1) and the adhesive layer (β2) can be efficiently produced by applying a coating solution for forming the adhesive layer (β2) onto the support (β1), drying the resulting coating film, and optionally producing a crosslinked structure.

[Gas Barrier Laminate]

The gas barrier laminate of the present invention is a gas barrier laminate comprising a base layer; the gas barrier layer laminated on one surface (A) of the base layer, directly or with another layer sandwiched therebetween; a protective film (α) laminated directly on the gas barrier layer; and a protective film (β) laminated on a surface (B) opposite to the surface (A) of the base layer, directly or with another layer sandwiched therebetween.

When the gas barrier laminate of the present invention has the other layer between the base layer and the gas barrier layer, examples of the other layer include a primer layer. The primer layer is not particularly limited and can be formed in accordance with a known method.

When the gas barrier laminate of the present invention has the other layer between the base layer and the protective film (β), examples of the other layer include a hard coating layer.

Examples of the gas barrier laminate of the present invention include those shown in FIG. 1 and FIG. 2.

The gas barrier laminate (1) shown in FIG. 1 is a gas barrier laminate having a base layer (2), a gas barrier layer (3) laminated directly on one surface (A) of the base layer (2), a protective film (α) (4) laminated directly on the gas barrier layer (3), and a protective film (β) (5) laminated directly on a surface (B) opposite to the surface (A) of the base layer (2).

When the protective film (α) (4) has the adhesive layer (α2) (not shown), the protective film (α) (4) is arranged such that the adhesive layer (α2) is opposed to the gas barrier layer (3).

When the protective film (β) (5) has the adhesive layer (β2) (not shown), the protective film (β) (5) is arranged such that the adhesive layer (β2) is opposed to the base layer (2).

On the other hand, the gas barrier laminate (6) shown in FIG. 2 is a gas barrier laminate having a base layer (7), a gas barrier layer (9) laminated on one surface (A) of the base layer (7), with another layer (8) sandwiched therebetween, a protective film (α) (10) laminated directly on the gas barrier layer (9), and a protective film (β) (12) laminated on a surface (B) opposite to the surface (A) of the base layer (7), with another layer (11) sandwiched therebetween.

The adhesion at the time of peeing the protective film (α) constituting the gas barrier laminate of the present invention, at a peel rate of 10 m/minute and a peel angle of 180°, is 0.1 N/50 mm or less, and preferably 0.01 to 0.08 N/50 mm.

More specifically, the adhesion of the protective film (α) or protective film (β) can be measured by the method described in the Examples.

Because the adhesion of the protective film (α) when peeled under these conditions is 0.1 N/50 mm or less, the protective film (α) can be peeled off without damaging the exposed surface or generating a paste residue, and even after the protective film (α) is peeled off, the original water vapor-blocking properties are maintained in the remaining laminate.

When the laminated film having the support (α1) and the adhesive layer (α2) described above is used as the protective film (α), the laminated film having the above-described adhesion can be efficiently obtained by using an acrylic polymer or a polyolefin-based polymer as the polymer in the adhesive layer (α2).

On the other hand, the adhesion at the time of peeing the protective film (β) at a peel rate of 10 m/minute and a peel angle of 180° is 1.5 N/50 mm or less, and preferably 0.1 to 1.0 N/50 mm.

Because the adhesion of the protective film (β) when peeled under these conditions is 1.5 N/50 mm or less, the protective film (β) can be peeled off without damaging the exposed surface or generating a paste residue, and even after the protective film (β) is peeled off, the original water vapor-blocking properties are maintained in the remaining laminate.

When the laminated film having the support (β1) and the adhesive layer (β2) described above is used as the protective film (β), the laminated film having the above-described adhesion can be efficiently obtained by using an acrylic polymer having a repeating unit derived from 2-ethylhexyl (meth)acrylate, as the polymer in the adhesive layer (β2).

The storage modulus of the adhesive layer (α2) is preferably higher than the storage modulus of the adhesive layer (β2), in order to set the adhesion of the adhesive layer (α2) and the adhesion of the adhesive layer (β2) to the above-mentioned values.

When the protective film (α) constituting the gas barrier laminate of the present invention is peeled at a peel rate of 10 m/minute and a peel angle of 180°, and then the protective film (β) is peeled at a peel rate of 10 m/minute and a peel angle of 180°, the remaining laminate usually has a water vapor permeability of less than $0.2 \ \text{g·m}^{-2}\text{·day}^{-1}$, and preferably $1 \times 10^{-6}$ to $1 \times 10^{-2} \ \text{g·m}^{-2}\text{·day}^{-1}$.

The water vapor permeability can be measured by the method described in the Examples.

Because the gas barrier laminate of the present invention has the above-described properties, it is suitably used as materials for producing sensor devices, such as film-shaped sensors, or optical devices, such as organic EL devices.

EXAMPLES

The present invention will be described in more detail below with reference to Examples, although the present invention is in no way limited to Examples below.

The units "part(s)" and "%" in the examples refer to "part(s) by mass" and "% by mass", respectively, unless otherwise indicated.

[Measurement of Adhesion]

The protective film (α) or (β) of the gas barrier laminate (width: 50 mm) obtained in each of the Examples and Comparative Examples was peeled at a peel angle of 180° and a peel rate of 0.3 m/minute or 10 m/minute, in accordance with JIS Z0237: 2000, and the adhesion (N/50 mm) at that time was measured.

[Evaluation of External Appearance]

Each of the protective film (α) and the protective film (β) of the gas barrier laminate (width: 500 mm) obtained in each of the Examples and Comparative Examples was sequentially peeled at a peel rate of 10 m/minute, and the external appearance of the remaining laminate was visually observed. As a result, a laminate having no defect in the external appearance was evaluated as "good", and a laminate in which at least one of cracks, scratches, and cloudiness occurred was evaluated as "bad".

[Measurement of Water Vapor Permeability]

For each of the gas barrier laminates obtained in the Examples and Comparative Examples, the water vapor permeability was measured under an environment at a temperature of 40° C. and a relative humidity of 90%, using AQUATRAN manufactured by MOCON Inc.

Moreover, for each of the laminates (laminates having the structure of the base layer/the gas barrier layer) used in the evaluation of external appearance, the water vapor permeability was measured under the same conditions.

Production Example 1

100 parts of a 2-ethylhexyl acrylate-based resin (COPONYLN-4399 manufactured by Nippon Synthetic Chemical Industry Co., Ltd.) and 4 parts of an isocyanate-based crosslinking agent (K-315 manufactured by SAIDEN CHEMICAL INDUSTRY CO., LTD.) were mixed to obtain an adhesive composition (1).

Production Example 2

100 parts of a 2-hydroxyethyl acrylate-based resin (ORIBAIN BPS6393-K manufactured by TOYOCHEM CO., LTD.) and 2 parts of an isocyanate-based crosslinking agent (curing agent K-315 manufactured by SAIDEN CHEMICAL INDUSTRY CO., LTD.) were mixed to obtain an adhesive composition (2).

Production Example 3

100 parts of a butyl acrylate-based resin (LT-55 manufactured by SAIDEN CHEMICAL INDUSTRY CO., LTD.) and 2 parts of an isocyanate-based crosslinking agent (curing agent K-315 manufactured by SAIDEN CHEMICAL INDUSTRY CO., LTD.) were mixed to obtain an adhesive composition (3).

Production Example 4

The adhesive composition (1) obtained in Production Example 1 was used to form an adhesive layer having a thickness of 5 μm and a storage modulus at 25° C. of $3.0 \times 10^5$ Pa, on a polyester-based film (PET50-U40 manufactured by Toray Industries, Inc.), to obtain a protective film β-i).

Production Example 5

The adhesive composition (2) obtained in Production Example 2 was used to form an adhesive layer having a thickness of 12 μm and a storage modulus at 25° C. of $1.0 \times 10^5$ Pa, on a polyester-based film (PET50-U40 manufactured by Toray Industries, Inc.), to obtain a protective film (β-ii).

Production Example 6

The adhesive composition (3) obtained in Production Example 3 was used to form an adhesive layer having a thickness of 20 μm and a storage modulus at 25° C. of $8.0 \times 10^5$ Pa, on a polyester-based film (PET50-U40 manufactured by Toray Industries, Inc.), to obtain a protective film (β-iii).

Production Example 7

The adhesive composition (1) obtained in Production Example 1 was used to form an adhesive layer having a thickness of 40 μm and a storage modulus at 25° C. of $3.0 \times 10^5$ Pa, on a polyester-based film (PET50-U40 manufactured by Toray Industries, Inc.), to obtain a protective film (β-iv).

Example 1

A perhydropolysilazane-containing solution (AQUAMICA NL110-20 manufactured by Merck Performance Materials Ltd.; solvent: xylene; concentration: 10%) was applied onto a polyester-based film (PET50A4300 manufactured by TOYOBO CO., LTD.; thickness: 50 μm) as a base layer, and dried at 120° C. for 2 minutes to form a perhydropolysilazane layer having a thickness of 200 nm.

Next, using a plasma ion implantation apparatus (RF power supply: RF56000 manufactured by JEOL Ltd.; high-voltage pulse power supply: PV-3-HSHV-0835 manufactured by Kurita Manufacturing Co., Ltd.), the perhydropolysilazane layer was subjected to plasma ion implantation under the conditions below to form a gas barrier layer, thereby obtaining a gas barrier film having the base layer (polyester-based film) and the gas barrier layer laminated directly on one surface (A) of the base layer.

Plasma-producing gas: Ar
Gas flow rate: 100 sccm
Duty ratio: 0.5%
Applied voltage: −6 kV
RF power supply: frequency 13.56 MHz, applied power 1000 W
Chamber internal pressure: 0.2 Pa
Pulse width: 5 μsec
Treatment time (ion implantation time): 200 seconds As a protective film (α), a polyolefin-based film (a low-density polyethylene base and an olefin-based adhesive, SUNYTECT PAC-3-50THK manufactured by Sun A. Kaken Co., Ltd.) was attached to the gas barrier layer-side of the obtained gas barrier film. Next, as a protective film (β), the protective film (β-i) obtained in Production Example 4 was attached to the base layer-side of the gas barrier film to obtain a gas barrier laminate.

Example 2

A gas barrier laminate was obtained as in Example 1, except that a cycloolefin polymer-based film (ZF14-040 manufactured by Zeon Corporation) was used, instead of the polyester-based film as a base layer in Example 1.

Example 3

A gas barrier laminate was obtained as in Example 1, except that a polycarbonate-based film (PURE-ACE C110-100 manufactured by TEIJIN LIMITED) was used, instead of the polyester-based film as a base layer in Example 1.

Example 4

A gas barrier laminate was obtained as in Example 1, except that a polyethylene naphthalate-based film (PEN50Q65HW manufactured by Teijin Film Solutions Limited) was used, instead of the polyester-based film as a base layer in Example 1.

Example 5

A gas barrier laminate was obtained as in Example 1, except that a polypropylene-based film (a polypropylene base and an acrylic adhesive, TRETEC 7531 manufactured by Toray Industries, Inc.) was used, instead of the polyolefin-based film as a protective film (α) in Example 1.

Example 6

A gas barrier laminate was obtained as in Example 1, except that the protective film (β-ii) obtained in Production Example 5 was used as a protective film (β) in Example 1.

Example 7

A gas barrier layer was formed on a polyester-based film (PET50A4300 manufactured by TOYOBO CO., LTD.; thickness: 50 μm) as a base layer, by the following method, to obtain a gas barrier film.
(Method of Forming Gas Barrier Layer)
Using an electron beam heating-type vacuum deposition apparatus, a silicon oxide material (SiO manufactured by Canon Optron Inc.) was evaporated by electron beam heating, and a SiOx film having a cured film thickness of 50 nm was formed under a pressure of 0.015 Pa during film formation. Vapor deposition condition was an acceleration voltage of 40 kV and an emission current of 0.2 A.

A gas barrier laminate was obtained as in Example 1, except that this gas barrier film was used.

Comparative Example 1

A gas barrier laminate was obtained as in Example 1, except that the protective film (β-i) obtained in Production Example 4 was used as a protective film (α) in Example 1.

Comparative Example 2

A gas barrier laminate was obtained as in Example 1, except that the protective film (β-iii) obtained in Production Example 6 was used as a protective film (β) in Example 1.

Comparative Example 3

A gas barrier laminate was obtained as in Example 1, except that the protective film (β-iv) obtained in Production Example 7 was used as a protective film (β) in Example 1.

The above-described evaluation tests were performed on the gas barrier laminates obtained in Examples 1 to 7 and Comparative Examples 1 to 3. The results are shown in Table 1.

TABLE 1

| | Adhesion Measurement [N/50 mm] | | | | | Water Vapor Permeability $[g \cdot m^{-2} \cdot day^{-1}]$ | |
|---|---|---|---|---|---|---|---|
| | Peel Rate [0.3 m/min] | | Peel Rate [10 m/min] | | External | | |
| | Protective Film (α) | Protective Film (β) | Protective Film (α) | Protective Film (β) | Appearance Evaluation | before Peeling | after Peeling |
| Example 1 | 0.05 | 0.8 | 0.08 | 1 | good | $8 \times 10^{-3}$ | $9 \times 10^{-3}$ |
| Example 2 | 0.04 | 0.4 | 0.07 | 0.5 | good | $9 \times 10^{-3}$ | $9 \times 10^{-3}$ |
| Example 3 | 0.04 | 0.5 | 0.08 | 0.6 | good | $7 \times 10^{-3}$ | $9 \times 10^{-3}$ |
| Example 4 | 0.05 | 0.9 | 0.08 | 1.1 | good | $1 \times 10^{-2}$ | $1 \times 10^{-2}$ |
| Example 5 | 0.09 | 0.8 | 0.09 | 1 | good | $8 \times 10^{-3}$ | $1 \times 10^{-2}$ |
| Example 6 | 0.04 | 1.1 | 0.08 | 1.3 | good | $8 \times 10^{-3}$ | $9 \times 10^{-3}$ |
| Example 7 | 0.04 | 0.9 | 0.05 | 1.1 | good | $7 \times 10^{-3}$ | $9 \times 10^{-3}$ |
| Comparative Example 1 | 0.5 | 0.8 | 0.7 | 1 | bad | $8 \times 10^{-3}$ | $8 \times 10^{-1}$ |
| Comparative Example 2 | 0.05 | 0.8 | 0.08 | 3 | bad | $8 \times 10^{-3}$ | $2 \times 10^{-1}$ |
| Comparative Example 3 | 0.05 | 2.5 | 0.08 | 5 | bad | $8 \times 10^{-3}$ | $1 \times 10^{-1}$ |

Table 1 shows the following.

In each of the gas barrier laminates obtained in Examples 1 to 7, the protective films can be peeled off at high speed, without adversely affecting the external appearance of exposed surfaces. Furthermore, even after the protective films are peeled off at high speed (peel rate: 10 m/minute), the original water vapor-blocking properties are maintained in the remaining laminate.

On the other hand, in the gas barrier laminate obtained in Comparative Example 1, the adhesion at the time of peeling the protective film (α) at a peel rate of 10 m/minute and a peel angle of 180° was excessively high.

Moreover, in each of the gas barrier laminates obtained in Comparative Examples 2 and 3, the adhesion at the time of peeling the protective film (β) at a peel rate of 10 m/minute and a peel angle of 180° was excessively high.

Thus, in each of the gas barrier laminates obtained in Comparative Examples 1 to 3, when the protective films are peeled off at high speed, cracks, scratches, or cloudiness occurs in the exposed surfaces. Moreover, the water vapor-blocking properties of the remaining laminate after peeling off the protective films are reduced compared to the water vapor-blocking properties of the gas barrier laminate before peeling off the protective films.

The invention claimed is:

1. A gas barrier laminate comprising:
    a base layer;
    a gas barrier layer laminated on one surface (A) of the base layer, directly or with another layer sandwiched therebetween;
    a protective film (α) laminated directly on the gas barrier layer; and
    a protective film (β) laminated directly on a surface (B) opposite to the surface (A) of the base layer, wherein the gas barrier layer is a layer containing a silicon-containing polymer compound with a modification treatment on a surface thereof,
    an adhesion at the time of peeling the protective film (α) at a peel rate of 10 m/minute and a peel angle of 180° is 0.1 N/50 mm or less, and
    an adhesion at the time of peeling the protective film (β) at a peel rate of 10 m/minute and a peel angle of 180° is 1.5 N/50 mm or less.

2. The gas barrier laminate according to claim 1, wherein the gas barrier layer contains at least one selected from the group consisting of silicon oxide, silicon nitride, silicon fluoride, silicon carbide, a metal oxide, a metal nitride, a metal fluoride, a metal carbide, and a composite compound containing elements constituting these compounds.

3. The gas barrier laminate according to claim 1, wherein the protective film (α) is a laminated film having a support (α1) and an adhesive layer (α2).

4. The gas barrier laminate according to claim 1, wherein when the protective film (α) is peeled at a peel rate of 10 m/minute and a peel angle of 180°, and then the protective film (β) is peeled at a peel rate of 10 m/minute and a peel angle of 180°, the remaining laminate has a water vapor permeability of less than 0.2 $g \cdot m^{-2} \cdot day^{-1}$.

5. The gas barrier laminate according to claim 1, wherein the gas barrier layer is obtained by modifying a surface of a layer that can be changed into a layer containing an inorganic compound by undergoing a modification treatment.

6. The gas barrier laminate according to claim 1, which is used for a sensor device or an optical device.

* * * * *